United States Patent
Zlotnick

(10) Patent No.: US 6,728,426 B1
(45) Date of Patent: Apr. 27, 2004

(54) COMPRESSION OF FORM IMAGES IN GRAY-LEVEL

(75) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,476

(22) Filed: Aug. 23, 1999

(51) Int. Cl.⁷ .............................. G06K 9/54; H04N 1/40
(52) U.S. Cl. ...................... 382/305; 382/232; 358/3.01
(58) Field of Search ................................ 382/305, 164, 382/175, 176, 178, 179, 217, 213, 232, 233, 237, 254, 264, 266, 274, 283, 284, 308; 358/1.9, 521, 450, 3.01, 1.16, 3.02; 707/500, 505

(56) References Cited

U.S. PATENT DOCUMENTS

| | | | |
|---|---|---|---|
| 5,182,656 A | 1/1993 | Chevion et al. ............. 358/452 |
| 5,204,756 A | 4/1993 | Chevion et al. ............. 382/239 |
| 5,623,558 A * | 4/1997 | Billawala et al. ........... 382/254 |
| 5,642,112 A | 6/1997 | Cooper ........................ 341/51 |
| 5,694,494 A * | 12/1997 | Hart et al. .................. 382/305 |
| 5,793,887 A | 8/1998 | Zlotnick ..................... 382/209 |
| 5,845,056 A * | 12/1998 | Kohler et al. ................ 358/1.9 |
| 5,896,464 A * | 4/1999 | Horiuchi et al. ............ 382/178 |
| 6,026,187 A * | 2/2000 | Siegel ........................ 382/213 |
| 6,064,773 A * | 5/2000 | Yamagata .................... 382/237 |
| 6,266,439 B1 * | 7/2001 | Pollard et al. ............. 382/164 |
| 6,330,357 B1 * | 12/2001 | Elmenhurst et al. ........ 382/175 |
| 6,507,671 B1 | 1/2003 | Kagan et al. ................ 382/173 |

FOREIGN PATENT DOCUMENTS

| EP | 0 550 234 | 7/1993 | .......... H04N/1/417 |
|---|---|---|---|
| EP | 0 720 377 | 7/1996 | ............ H04N/7/26 |

* cited by examiner

Primary Examiner—Bhavesh M. Mehta
Assistant Examiner—Kanji Patel
(74) Attorney, Agent, or Firm—Darby & Darby

(57) ABSTRACT

A method for compressing an electronic image of an object including gray-level information includes processing the gray-level information to identify a kernel of pixels in the image having respective gray-level values darker than a given kernel threshold. A locus of the pixels in the kernel is stored in a memory, along with the gray-level values of the pixels in the kernel, in order to reconstruct a gray-level image of the object by applying the stored gray-level values to the pixels in the locus.

47 Claims, 11 Drawing Sheets

COMPRESSION OF FORM IMAGES IN GRAY-LEVEL

FIELD OF THE INVENTION

The present invention relates generally to image processing, and specifically to efficient compression of varying image data appearing in a fixed template, such as characters written on a form.

BACKGROUND OF THE INVENTION

Businesses and organizations are increasingly turning to computerized storage of information filled in on documents such as paper forms, in addition to or in place of storing the forms themselves. After the form has been filled out, it is optically scanned and transferred to an electronic storage medium, such as a magnetic or optical disk. In order to ensure that the document is accurately reproduced when it is recalled from storage, it is necessary to scan the document at high resolution, typically on the order of 100 pixels/cm. To store an entire A4 page in this manner at eight bits/pixel, however, requires about 6 Mbytes of memory. Methods of image compression, as are known in the art, are applied to reduce the volume of data that must be recorded in order to reproduce a document.

A significant portion of the data in an image of a filled-in form corresponds to the form template, i.e., the lines, boxes, instructions, etc., that are preprinted on every form of a given type. Since this element of the form is predetermined and fixed, a useful way to reduce the volume of data that must be stored in recording the image of a filled-in form is to first remove the fixed template. Then the "fill image"—what remains of the form after removal of the template—is compressed and stored. Only a single image of the template needs to be stored, regardless of how many filled-in instances of a given form are to be stored and reproduced. To view the form as originally filled in, the template and fill images are recalled from memory and recombined. Another advantage of separating the fill image from the template is that it improves the accuracy of optical character recognition (OCR) programs used to interpret the characters in the fill image, which otherwise tends to be compromised by the presence of portions of the template near the characters.

U.S. Pat. Nos. 5,182,656, 5,204,756 and 5,793,887, which are incorporated herein by reference, describe methods for compressing and decompressing form images based on separation of the form template from the variable fill portion of the form. These patents are concerned mainly with improving the accuracy of registration of a pre-stored template image with the scanned document image that is to be compressed, so that the template can be more precisely removed from the image before compression and restored upon decompression. As is common in the art of document imaging, the methods of these patents address only binary images and do not relate to the distribution of gray levels in the actual document or in images captured thereof. Furthermore, these patents do not address problems that can arise when portions of the characters in the fill portion of the form overlap elements of the template. As a result of such overlap, when the template is removed from the document image, gaps may be left in some of the characters. Thus, improved image compression may be achieved, but at the expense of reduced readability in the stored images.

SUMMARY OF THE INVENTION

It is an object of the present invention to provide improved methods for compressing and decompressing images of filled-in form documents.

It is a further object of some aspects of the present invention to provide methods for improving readability of form document images following decompression.

In preferred embodiments of the present invention, a document scanner captures a gray-level image of a filled-in form document, based on a form template. An image of the template is removed from the captured image, as is known in the art. Groups of pixels in the image that remains having gray-level values below a given threshold are identified as belonging to a bi-level kernel of the image. The kernel thus defines the shapes of the characters that were filled into the form. A gray-level value is recorded for each of the pixels in the kernel, corresponding to the original value of the pixel in the captured image. A halo is defined surrounding the kernel, preferably by morphologically expanding the kernel by a predetermined amount in all directions, typically by a single pixel. For each of the pixels in the halo, the gray-level value from the captured image is recorded. Preferably, adjoining gray-level values are grouped together, and the gray-level resolution is reduced, most preferably to a user-selectable degree, so as to reduce the volume of gray-level data that must be stored. The gray-level data for both the kernel and halo pixels are then compressed, using any suitable algorithm known in the art. Both the kernel and the compressed gray-level data are stored in a memory.

Preferably, gray-level information in the image is used to close any gaps that may be left in characters in the kernel due to removal of the template, most preferably using methods described in European Patent Application 98480087.0, which is assigned to the assignee of the present patent application and incorporated herein by reference. Alternatively, the gaps are closed using methods based on distance transforms, as described in a U.S. Patent Application, filed on even date, entitled "Separating Text from Form Data in Document Images," which is assigned to the assignee of the present patent application and incorporated herein by reference. It will be understood, however, that while such gap-closing is desirable, and may be carried out using any suitable method known in the art, it is not essential to the present invention.

In order to reconstruct the image, an image of the template and the bi-level kernel are recalled from memory and combined in proper registration. The stored gray-level data are then decompressed and assigned to the appropriate pixels in the kernel and the halo. Preferably, the image of the template includes gray-level data, as well. At points of overlap between the kernel and features of the template, such as lines and text, substitute gray-level values are preferably computed so as to blend with the adjacent points of the kernel and of the template features. Similarly, at points at which the halo overlaps a dark or gray portion of the template, the gray-level values assigned to the halo may be replaced by darker values in the template.

In this manner, an image is reconstructed of the filled-in form that is more faithful to the actual appearance of the original, and is therefore easier and more pleasing to read than binary images of the form as are known in the art. While the volume of data storage required for a typical compressed gray-level image, in accordance with preferred embodiments of the present invention, is greater than for the binary image alone, it is still far less than could be achieved by conventional methods of gray-scale image compression.

There is therefore provided, in accordance with a preferred embodiment of the present invention, a method for compressing an electronic image of an object including gray-level information, including:

processing the gray-level information to identify a kernel of pixels in the image having respective gray-level values darker than a given kernel threshold;

storing a locus of the pixels in the kernel in a memory; and storing in the memory the gray-level values of the pixels in the kernel, in order to reconstruct a gray-level image of the object by applying the stored gray-level values to the pixels in the locus.

Preferably, the object includes a document, and processing the gray-level information includes identifying a kernel corresponding to information in the document. Most preferably, the document includes a form having a template printed thereon, and processing the gray-level information includes separating an image of the template from characters filled into the template using gray-level values of pixels corresponding to the template and to the characters. In a preferred embodiment, separating the image of the template from the characters includes removing the image of the template from an image of the characters and filling gaps left in the characters due to removal of the template image using the gray-level information.

Preferably, the method includes reconstructing the image by combining stored gray-level values corresponding to the image of the template with the stored locus and gray-level values of the pixels in the kernel, wherein combining the stored gray-level values corresponding to the image of the template with the gray-level values of the pixels in the kernel includes computing a combined gray-level value for a pixel at which the locus of the kernel overlaps with the image of the template. In a preferred embodiment, computing the combined gray-level value includes computing a normalized product of gray-level values from the kernel and from the template.

In a preferred embodiment, the method includes defining a halo in the image surrounding the kernel and storing in the memory the gray-level values of the pixels in the halo, for use in reconstructing the image. Preferably, defining the halo includes morphologically expanding the locus of the kernel. Most preferably, the method includes reconstructing the image by morphologically expanding the locus of the kernel and applying the stored gray-level values of the pixels in the halo to the expanded locus, wherein a locus of the pixels in the halo is not stored along with the stored locus of the kernel.

Preferably, storing the gray-level values of the pixels in the halo includes grouping the pixels by the respective gray-level values so as to reduce a volume of data to be stored. In a preferred embodiment, grouping the pixels includes masking one or more bits of the gray-levels values of the pixels, wherein masking the one or more bits includes eliminating from the halo pixels having gray-level values beyond a given halo threshold. Most preferably, the method includes storing a locus of the bits remaining in the halo after the pixels having gray-level values beyond the given halo threshold are eliminated therefrom.

Alternatively, grouping the pixels includes selecting a number of groups into which the pixels are to be divided and storing for each of the groups a respective representative gray-level value to for all of the pixels in the group.

In a preferred embodiment, the image to be compressed has a background including predetermined gray-level values of pixels therein, which are not stored along with the gray-level values of the pixels in the kernel and the halo, and the method includes reconstructing the image by combining the stored gray-level values of the pixels in the kernel and the halo with the gray-level values of the pixels in the background. Preferably, combining the stored gray-level values of the pixels in the halo with the gray-level values of the pixels in the background includes selecting for the reconstruction at each pixel of the halo the darker of the respective stored gray levels of the pixel.

Preferably, storing the gray-level values of the pixels in the kernel and in the halo includes storing the values as one or more continuous blocks of data and compressing the data in the blocks.

There is further provided, in accordance with a preferred embodiment of the present invention, a method for compressing an electronic image of an object including gray-level information, including:

processing the gray-level information to identify a first group of pixels in the image having respective gray-level values darker than a first threshold;

processing the gray-level information to identify a second group of pixels in the image, in proximity to pixels in the first group, having respective gray-level values lighter than the first threshold; and storing the gray-level values of the pixels in the first and second groups in a memory, in order to reconstruct a gray-level image of the object by applying the stored gray-level values to the respective pixels in the first and second groups.

Preferably, processing the gray-level information to identify the first group of pixels includes finding a locus of the pixels in the first group, and processing the gray-level information to identify the second group of pixels includes selecting pixels in a halo surrounding the locus of the first group, wherein selecting the pixels in the halo includes morphologically expanding the locus.

In a preferred embodiment, processing the gray-level information to identify the second group of pixels in the image includes selecting only pixels having gray-level values darker than a second threshold for inclusion in the second group.

Preferably, the object includes a document, and wherein processing the gray-level information includes identifying pixels corresponding to information content of the document. Most preferably, the document includes a preprinted template, and wherein processing the gray-level information to identify the first group includes eliminating the template from the image to be processed.

There is also provided, in accordance with a preferred embodiment of the present invention, a method for reconstructing an electronic image of a document having a template preprinted thereon, the image including information filled into the template, including:

receiving stored gray-level data corresponding to an image of the template;

receiving stored gray-level data corresponding to the information filled into the template; and combining the data corresponding to the images of the template and of the information in mutual registration to produce an output gray-level image of the document.

Preferably, the template represents a form, and wherein the information filled into the template includes characters written on the form.

Further preferably, the stored gray-level data corresponding to the image of the information includes a kernel, identifying a locus of pixels containing the information, and wherein combining the data includes applying respective stored gray-level values to the pixels in the kernel. Most preferably, combining the data includes finding a pixel at which the kernel intersects with a feature of the template and computing an output gray-level value of the pixel by combining respective stored gray-level values of the pixel in the image of the template and of the information.

In a preferred embodiment, the stored gray-level data corresponding to the information includes a halo of pixels surrounding the kernel and having gray-level values lighter than the values of the pixels in the kernel. Preferably, the stored gray-level data corresponding to the image of the template includes a background, and combining the images includes computing an output gray-level value of a pixel in the halo by combining respective stored gray-levels of the pixel in the background and in the information.

There is additionally provided, in accordance with a preferred embodiment of the present invention, apparatus for compressing an electronic image of an object including gray-level information, including:

a processor, which processes the gray-level information to identify a kernel of pixels in the image having respective gray-level values darker than a given kernel threshold; and a memory, in which the processor stores a locus of the pixels in the kernel along with the gray-level values of the pixels, whereby a gray-level image of the object is reconstructed by applying the stored gray-level values to the pixels in the locus.

In a preferred embodiment, the apparatus includes an image output device, wherein the processor reconstructs the image by combining stored gray-level values corresponding to the image of the template with the stored locus and gray-level values of the pixels in the kernel and outputs the reconstructed image to the output device.

There is moreover provided, in accordance with ape of the present invention, apparatus for compressing an electronic image of an object including gray-level information, including:

a processor, which processes the gray-level information to identify a first group of pixels in the image having respective gray-level values darker than a first threshold and a second group of pixels in the image, in proximity to pixels in the first group, having respective gray-level values lighter than the first threshold; and a memory, in which the processor stores the gray-level values of the pixels in the first and second groups, whereby a gray-level image of the object is reconstructed by applying the gray-level values to the respective pixels in the first and second groups.

There is additionally provided, in accordance with a preferred embodiment of the present invention, apparatus for reconstructing an electronic image of a document having a template preprinted thereon, the image including information filled into the template, including:

a processor, which receives stored gray-level data corresponding to an image of the template and to the information filled into the template, and which combines the data corresponding to the image of the template and the information in mutual registration to produce an output gray-level image of the document; and an image output device, which receives and displays the output gray-level image.

There is further provided, in accordance with a preferred embodiment of the present invention, a computer software product including computer-readable instructions in an executable file, which when run by a computer that receives an electronic gray-level image of an object, causes the computer to process the image so as to identify a kernel of pixels in the image having respective gray-level values darker than a given kernel threshold, and to store in a memory a locus of the pixels in the kernel along with gray-level values of the pixels in the kernel, to be used in reconstructing the gray-level image of the object by applying the stored gray-level values to the pixels in the locus.

Preferably, the object includes a form document having a template printed thereon, and wherein the instructions cause the computer to separate an image of the template from characters filled into the template using gray-level values of pixels corresponding to the template and to the characters.

There is also provided, in accordance with a preferred embodiment of the present invention, a computer software product including computer-readable instructions in an executable file, which when run by a computer that receives an electronic gray-level image of an object, causes the computer to process the gray-level information to identify a first group of pixels in the image having respective gray-level values darker than a first threshold and a second group of pixels in the image, in proximity to pixels in the first group, having respective gray-level values lighter than the first threshold, and to store the gray-level values of the pixels in the first and second groups in the memory, to be used in reconstructing a gray-level image of the object by applying the gray-level values to the respective pixels in the first and second groups.

There is furthermore provided, in accordance with preferred embodiment of the present invention, a computer software product including computer-readable instructions in an executable file, which when run by a computer, causes the computer to recall from a memory stored gray-level data corresponding to an image of a template preprinted on a form document and further to recall stored gray-level image data corresponding to information that was filled into the template, and to combine the data corresponding to the image of the template and to the information in mutual registration to produce an output gray-level image of the document.

The present invention will be more fully understood from the following detailed description of the preferred embodiments thereof, taken together with the drawings in which:

BRIEF DESCRIPTION OF THE DRAWINGS

FIG. 2C is a schematic reproduction of the characters appearing on the form of FIG. 2A after removal of the template from the image;

FIG. 2E is a schematic reproduction of a reconstructed image of the form of FIG. 2A, in accordance with a preferred embodiment of the present invention;

DETAILED DESCRIPTION OF PREFERRED EMBODIMENTS

Figure 1:
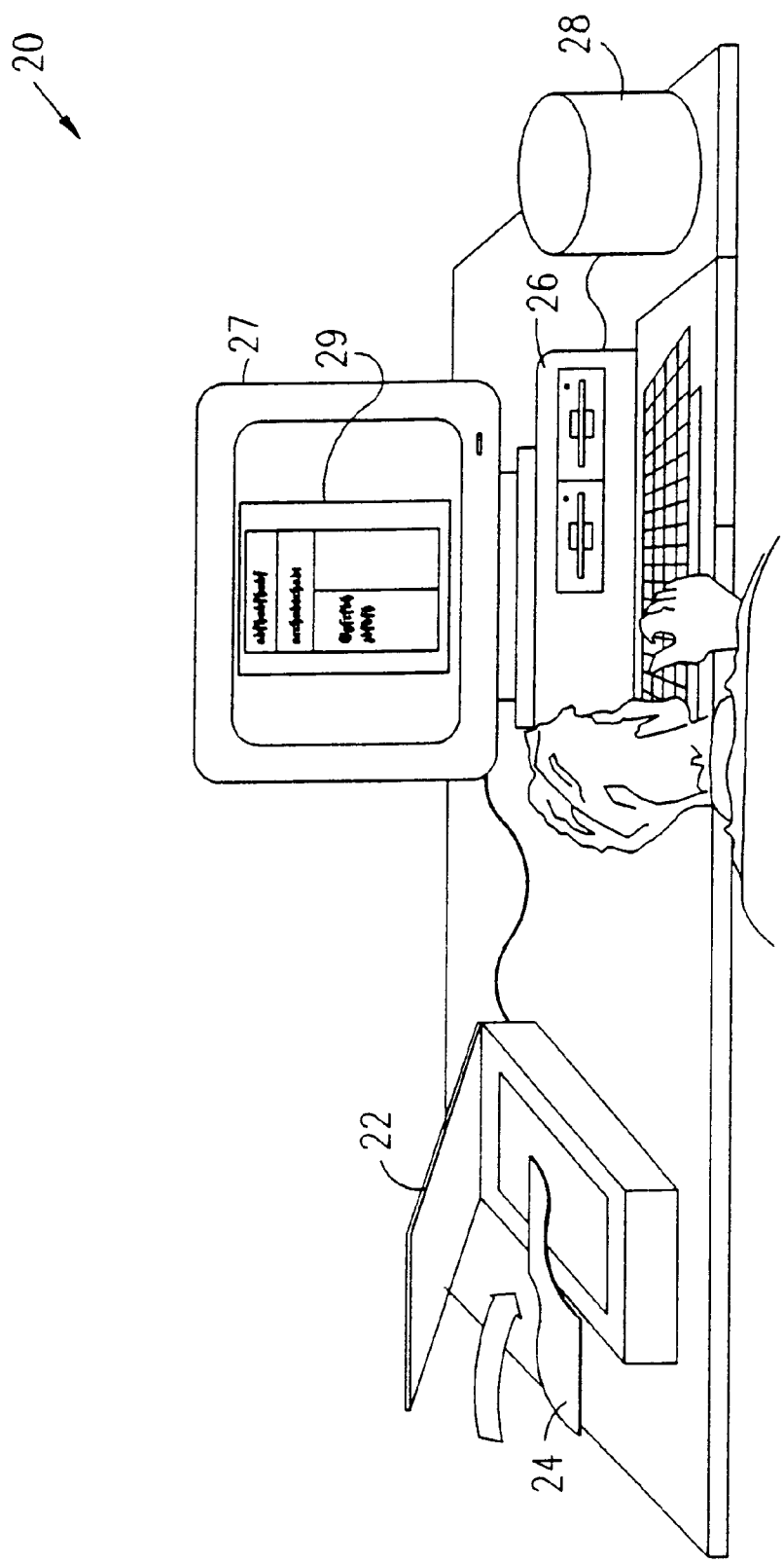
FIG. 1 is a schematic, pictorial illustration of a system for capturing, storing and reproducing images of filled-in form documents, in accordance with a preferred embodiment of the present invention.

FIG. 1 is a schematic, pictorial illustration of a system 20 for storage and display of document images, in accordance with a preferred embodiment of the present invention. System 20 comprises a scanner 22, or any suitable type of image capture device known in the art, which receives and scans a document 24 comprising a preprinted form, which is filled in with handwritten, typed or printed characters. The scanner captures a gray-level image of the document, preferably at eight bits per pixel, and conveys the corresponding image data to a form processor 26, typically comprising a suitable general-purpose computer. Alternatively, the gray-level image is input to the processor from another source. Processor 26 compresses the image and stores the resultant compressed image data in a memory 28, such as a magnetic or optical disk. Additionally or alternatively, the compressed data are transmitted to another computer over a network. When the form is to be reviewed, the relevant data are recalled by processor 26 (or by any other suitable processor), and are then decompressed and displayed as a form image 29 on a display screen 27. Alternatively, the decompressed image is printed by a suitable printer (not shown).

The image compression and decompression functions are preferably performed using software running on processor 26, which implements the principles of the present invention, as described in detail hereinbelow. The software may be supplied on tangible media, such as diskettes or CD-ROM, and loaded into the processor. Alternatively, the software may be downloaded to the processor via a network connection or other electronic link. Further alternatively, processor 26 may comprises dedicated, hard-wired elements or a digital signal processor for carrying out the image compression and/or decompression steps.

It is also noted that while preferred embodiments of the present invention are described herein with reference to gray-level images captured and reproduced at eight bits per pixel, the methods of the present invention may be applied at substantially any level of gray-level resolution, from two bits per pixel and up. Those skilled in the art will appreciate that the principles of the invention may likewise be applied, mutates mutandis, to color images.

Figure 2A:
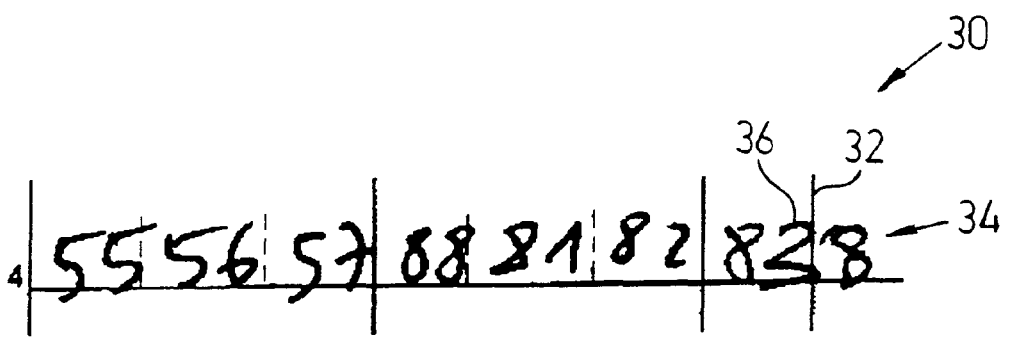
FIG. 2A is a schematic reproduction of a detail of an image of a form, including characters filled into a form template, captured by the system of FIG. 1.

FIG. 2A is a schematic reproduction of a detail of an image 30 of document 24 that is captured by system 20. The image includes characters 34 filled into a form template 32 that is preprinted on the document. Many of the characters, such as a character 36, overlap with the lines of the template. Such overlap is very common when forms are filled out by hand and even occurs when the form is filled in by typing or printing.

Figure 2B:
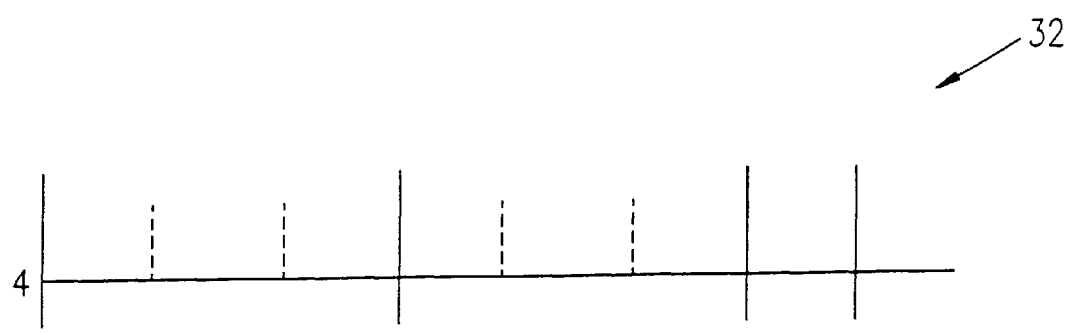
FIG. 2B is a schematic reproduction of a detail of the template appearing on the form of FIG. 2A.

FIG. 2B shows the portion of template 32 that appears in FIG. 2A. Preferably, the template is stored in memory 28 and is known to processor 26 in advance of processing image 30. As a first step in processing the image 30, the processor locates and registers the known template stored in the memory with the appropriate pixels of the template in image 30. Most preferably, such registration is accomplished using methods described in the above-mentioned U.S. Pat. No. 5,793,887 for the purpose of overcoming any distortions that may exist in image 30.

Figure 2C:
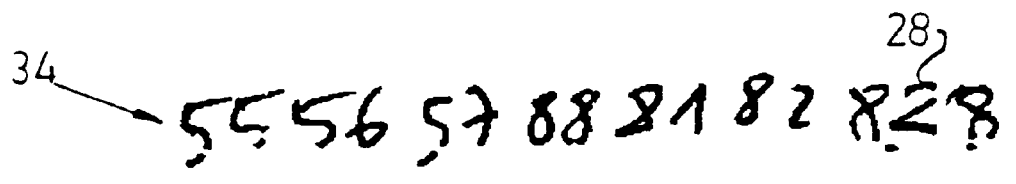

FIG. 2C shows characters 34 that remain after removal of template 32 from the image. Gaps are left in the characters at pixels where the characters originally overlapped the template. In some cases, as illustrated particularly by a character 28, the gap may so alter the appearance of the character that an optical character recognition program operating on the image, or even a human reader, may misinterpret the character (in this case reading the "3" shown in FIG. 2A as a "2").

The above-mentioned European Patent Application 98480087.0 provides a solution to this problem, which is used in preferred embodiments of the present invention. It will be understood, however, that such "gap filling" is not essential to the present invention, and the inventive principles of image compression described herein may be applied with or without filling such gaps. Gray-level data corresponding to template 32, as shown in FIG. 2B, are preferably analyzed to establish a distribution of the gray levels in the template image. Most preferably, pixels in the template image that are in close proximity to the filled-in characters are not included in determining the distribution. Gray-level data corresponding to characters 34 remaining after removal of the template, as shown in FIG. 2C, are similarly analyzed. A gray-level threshold is then determined that provides an optimal separation between the two distributions. (Typically, the pixels corresponding to the filled-in characters are darker than the template pixels.) Pixels belonging to the template image having gray-level values below the threshold are assumed to be parts of characters and are transferred to the character image.

Preferably, the process of finding gray-level distributions of the template image and of the characters, and of transferring pixels from the template to the character image, is repeated one or more additional times. Attention is given particularly to pixels in the template image that are touching or in close proximity to pixels corresponding to the characters. In this way, pixels are successively transferred from the template image to the characters until the gaps are filled.

Alternatively, the gaps in the characters are closed using other methods, most preferably methods based on distance transforms, as described in the above-mentioned U.S. Patent Application entitled "Separating Text from Form Data in Document Images."

Figure 2D:
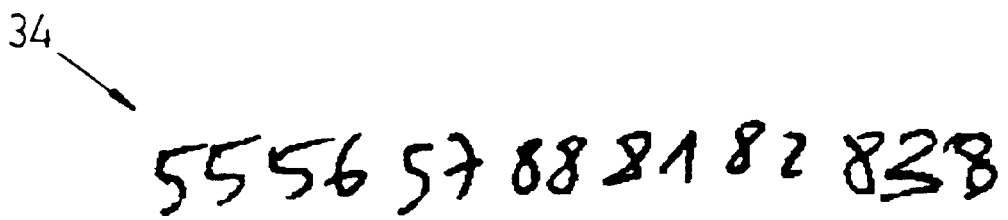
FIG. 2D is a schematic reproduction of the characters of FIG. 2C after filling in gaps in the characters created by the removal of the template, in accordance with a preferred embodiment of the present invention.

FIG. 2D illustrates the results of this process, as the gaps created in characters 34 by removal of template 32 are now largely filled in. A "kernel" of the fill image is defined by binarizing the characters, as is known in the art, i.e., by choosing a threshold and labeling all pixels in the image having gray-level values below the threshold as "black." In the context of the present patent application and in the claims, the geometrical locus of the black pixels is termed the kernel of the filled-in portion of image 30 of document 24.

Figure 3A:
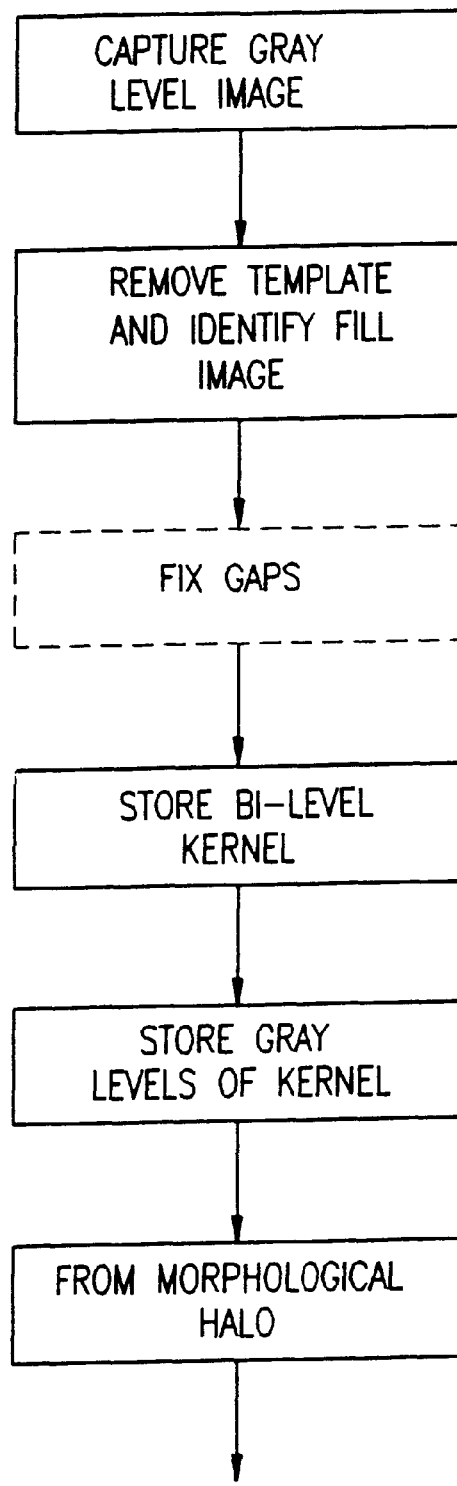
FIGS. 3A and 3B are flow charts that schematically illustrate a method for compressing an image of a filled-in form document, in accordance with a preferred embodiment of the present invention.
Figure 3B:
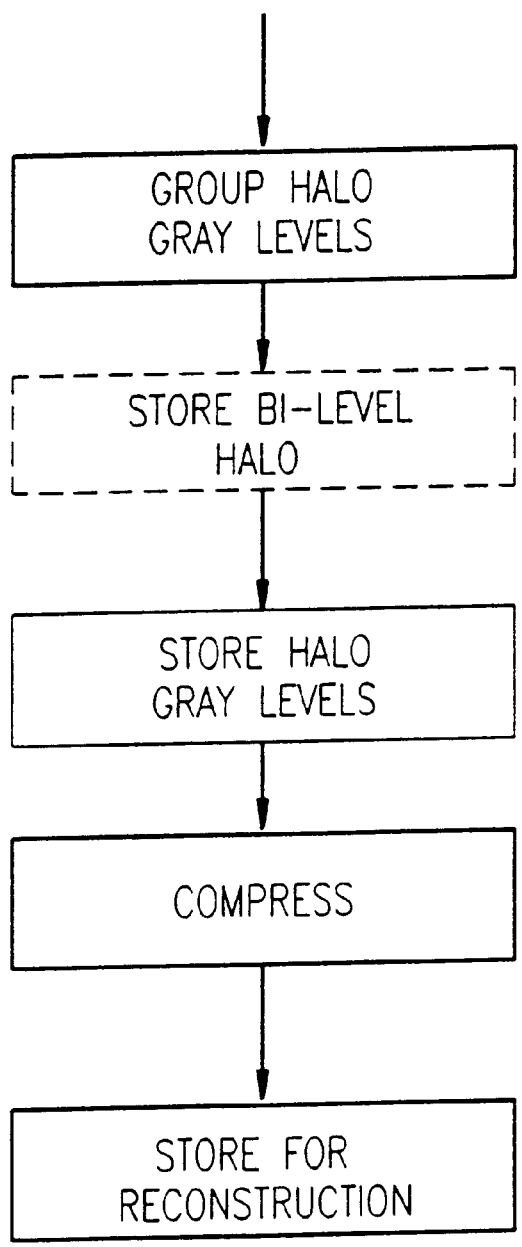

FIGS. 3A and 3B are flow charts that schematically illustrate a method employed by system 20 to compress image 30, in accordance with a preferred embodiment of the present invention. The initial steps of the method include capturing the gray-level image of document 24, removing template 32 from the image, identifying the fill portion of the image (i.e., characters 34) and then filling in the gaps left in the fill portion by removal of the template. These steps were described above with reference to FIGS. 2A–2D. For each of the pixels identified as belonging to the kernel, processor 26 reads and saves gray-level data from image 30. In order to conserve memory while storing the gray-level data, processor 26 preferably writes the gray-level values of the pixels one after another as a continuous data block in the sequence in which the corresponding pixels appear in the kernel.

Figure 4:
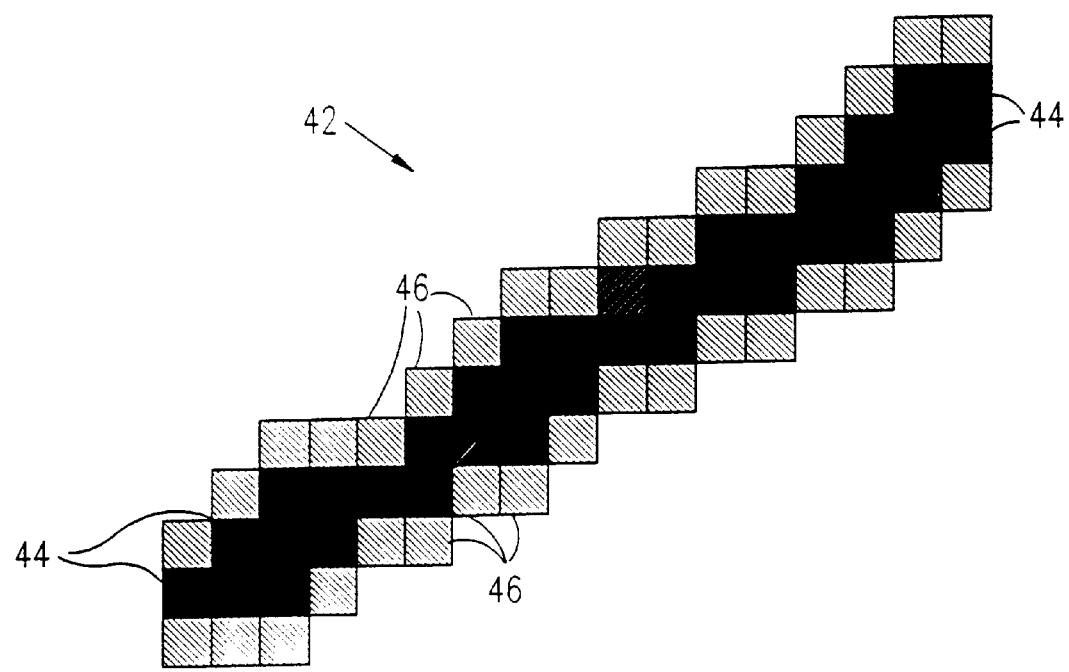
FIG. 4 is a schematic diagram showing details of pixels in an image captured and compressed according to the method of FIGS. 3A and 3B.

Reference is now made to FIG. 4, which schematically illustrates a detail 42 of one of characters 34, which is processed in accordance with the method of FIGS. 3A and 3B. Pixels 44 belonging to the image kernel are shown in black. The kernel is morphologically expanded outwards, preferably by a single pixel, in order to form a halo made up of pixels 46, shown in the figure in gray. Processor 26 then reads the gray-level values of halo pixels 46 and writes these values for storage as a continuous data block, in similar fashion to the gray levels of the kernel pixels.

Preferably, as indicated in FIG. 3B, the gray-level values of halo pixels 46 are grouped in order to reduce the volume of data that must be stored. One method of grouping, in accordance with a preferred embodiment of the present invention, is to mask one or more bits of the halo pixels. Most preferably, all but the three most significant bits are masked out. Such masking is equivalent to setting a second gray-level threshold, in addition to the threshold used to delineate the kernel, below which the halo pixels will be identified as black (assuming that white=255 and black=0). Alternatively or additionally, a threshold may be set above which halo pixels will be identified as white.

Optionally, if a large number of the halo pixels become identified as white, the white pixels are dropped entirely from the halo data block. In this case, since there is no longer a morphologically-complete halo surrounding the kernel, a bi-level image of the remaining halo pixels is formed in order to identify the locations of the pixels whose gray-level values are stored in the halo data block. Processor 26 preferably decides whether to record the bi-level halo image or to retain all of the halo pixel values, including the white pixels, based on which of the two options will give the smaller file of data to be stored in memory 28.

In another preferred embodiment of the present invention, the halo pixels and, optionally, the kernel pixels are grouped by defining a range of gray-level values that are to correspond to each group. Preferably, a user of system 20 defines a desired number of groups. Processor 26 then selects threshold values so as to divide the relevant pixels into the desired number of groups, preferably with an equal number of pixels in each of the groups. A representative gray-level value, such as the mean or median gray level, is determined and stored for each group in place of the original gray-level values. The smaller the number of groups selected, the greater is the degree of image compression achieved, although the compression may be at the expense of image quality in the reconstructed image. Typically the user will select the number of gray-level groups that gives an optimal tradeoff between compression and image quality for the user's application.

Figure 5:
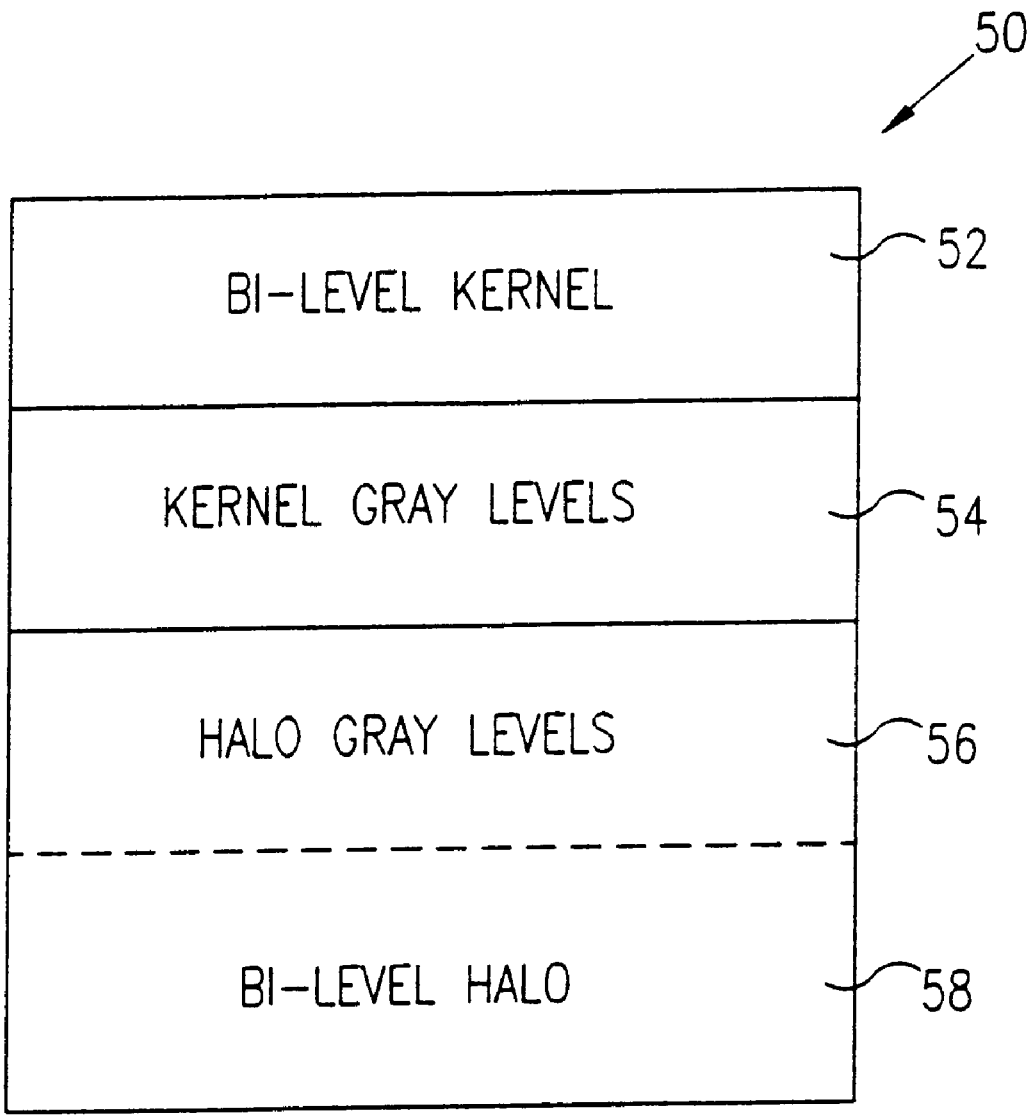
FIG. 5 is a schematic block diagram showing the structure of a file in which data are stored corresponding to a compressed image of a filled-in form document, in accordance with a preferred embodiment of the present invention.

FIG. 5 is a block diagram that schematically illustrates the structure of such a data file 50, in accordance with a preferred embodiment of the present invention. The data file comprises a bi-level kernel block 52 and, preferably, gray-level data blocks 54 and 56 containing the gray-level data from image 30 respectively corresponding to the kernel pixels and halo pixels. Alternatively, blocks 54 and 56 are combined, so that the kernel and halo gray-level data are stored together sequentially. The halo data is then separated from the kernel data for reconstruction of the image by performing an "exclusive OR" operation with the bi-level kernel data in block 52. Further alternatively or additionally, when the optional bi-level halo image is to be recorded, it is saved in a bi-level halo block 58.

Preferably, the data in file 50 are compressed before storage, using any suitable compression algorithms known in the art. Most preferably, the gray-level data in each of blocks 54 and 56 are compressed using the LZW algorithm, as described, for example, in U.S. Pat. No. 5,642,112, which is incorporated herein by reference. Optionally, the bi-level data in blocks 52 and 58 are compressed using Huffman coding or other techniques suitable for binary image data. The compressed file is then stored in memory 28 or, alternatively or additionally, is transmitted over a network to a recipient computer and/or data store.

Figure 6:
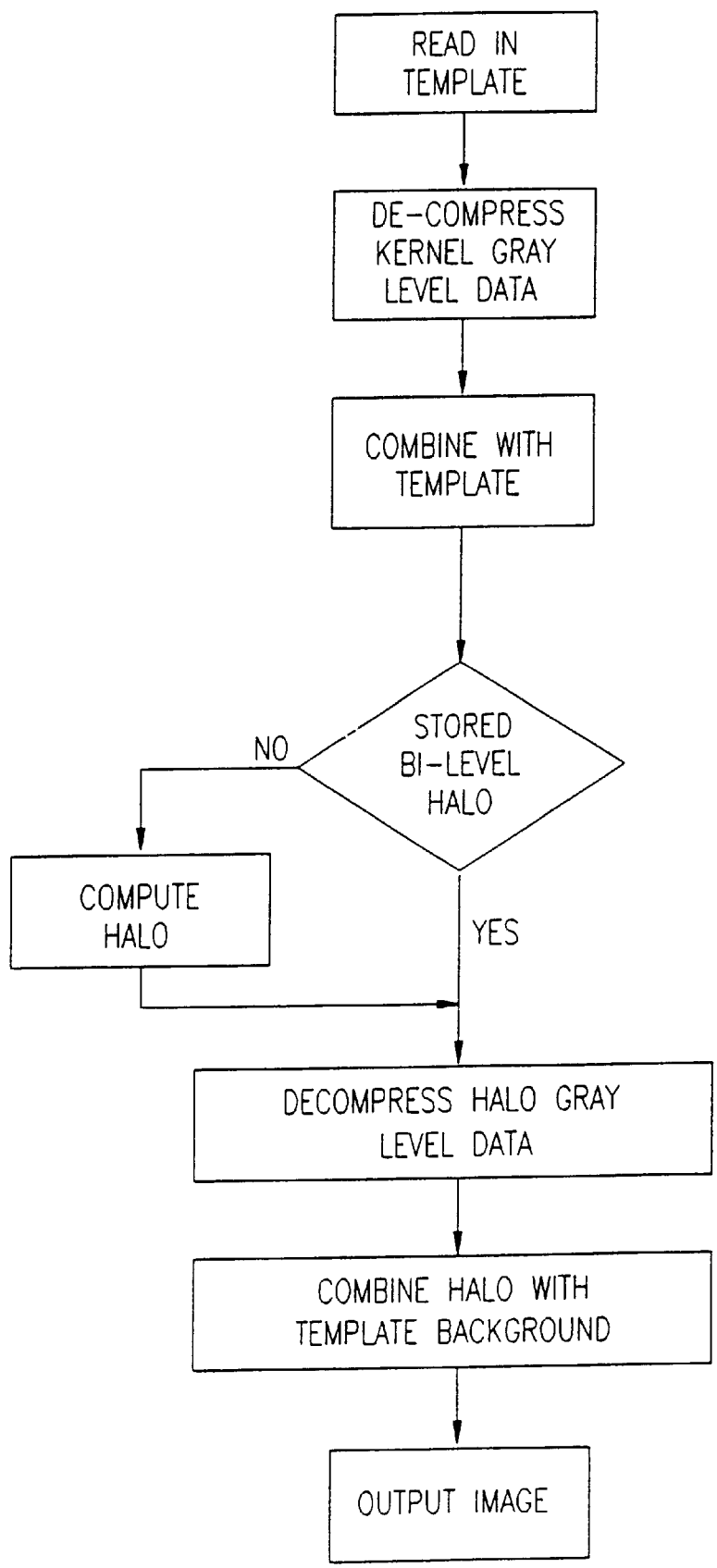
FIG. 6 is a flow chart that schematically illustrates a method for decompressing an image of a filled-in form document, in accordance with a preferred embodiment of the present invention.

FIG. 6 is a flow chart that schematically illustrates a method for reconstruction of image 29 of document 24 (shown in FIG. 1), using file 50 stored in memory 28, in accordance with a preferred embodiment of the present invention. Processor 26 reads in from memory an image of template 22 (a detail of which is shown in FIG. 2B), preferably comprising gray-scale image data. The locus of the bi-level kernel of the fill image is read in from block 52 and is registered with the template, as is known in the art. The gray-level data corresponding to the kernel in block 54 are decompressed and applied to the pixels in the kernel. Preferably, at any pixels that are common to the kernel and the template image, an appropriate gray-level value for the pixel is determined by combining the respective gray-level values of the pixel in the template and fill images. Most preferably, the function is such that the combined value is darker than both the template and fill values, for example, D*T/256, wherein D is the fill image gray-level value, and T is the template gray-level value.

In order to reconstruct the halo, it is necessary to know whether there is a bi-level halo image stored in file 50. If so, this bi-level image is read out, and the halo gray-level values in block 56 are decompressed and applied to the appropriate pixels identified by the bi-level image. Otherwise, the locus of the halo is computed using substantially the same morphological operation (preferably expansion by a single pixel) as was used to determine the halo in image 30 prior to compression and storage. The stored halo gray-level values are then applied to the newly-computed halo.

Figure 2E:
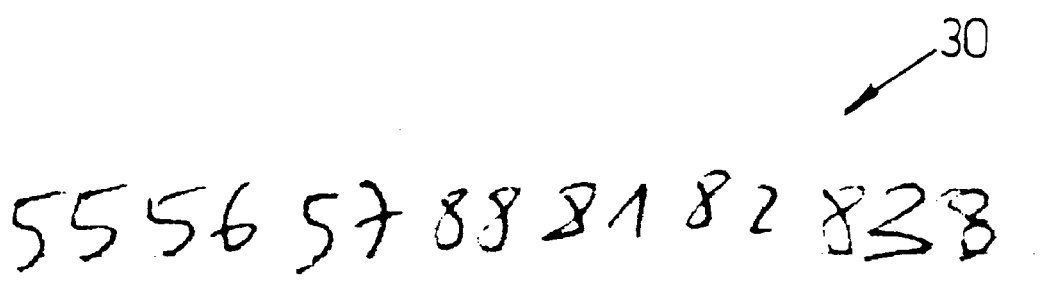

FIG. 2E is a schematic reproduction of a detail of image 30 following reconstruction in accordance with the method of FIG. 6. In this example, the template includes a gray or patterned background 30, preferably corresponding to the actual background on the original document 24 (such as the patterned background that is commonly printed on checks). The background is preferably included in reconstructed document image 29 so that a person viewing the image will have a more realistic sense of the original document. It may occur that the gray-level values of some of the pixels in the halo in fill image 30 are lighter than the corresponding gray-level values of the background at those pixels. In this case, a background combination function is preferably applied so that the halo blends smoothly with the background, most preferably a function that takes the minimum of the background and halo gray-level values at each pixel in the halo.

The present invention is thus advantageous by comparison with methods of document image compression and reconstruction known in the art, in that it provides a viewer with a gray-level picture of the reconstructed document, rather than just a binary image. The gray-level picture is more pleasing to the eye and easier for the viewer to interpret. The gray-level information may also be useful in improving the accuracy of OCR programs applied to the image, although such programs are beyond the scope of the present patent application.

Optionally, other information is stored in memory 28, in or along with file 50, for use in optimizing the appearance of output gray-level image 29. For example, histogram information regarding the input image (which is derived by processor 26 for use in filling in the gaps shown in FIG. 2C) may be stored and used in adjusting gray-level distribution in the output image. Also, other combination functions, different from those mentioned hereinabove, may be used in combining the gray-level values of the kernel and the halo with those of the template and background. The optimal combination functions to be selected in each case depend on the characteristics of the input image. Optionally, the selected combination functions are determined while compressing the input image and are stored for use in reconstruction.

Although preferred embodiments are described hereinabove with reference to images of characters filled into a document template, it will be appreciated that the principles of the present invention may advantageously be applied to compression of line images of other types, such as line drawings. It will thus be understood that the preferred embodiments described above are cited by way of example, and the full scope of the invention is limited only by the claims.

What is claimed is:

1. A method for compressing an electronic image of an object including gray-level information, comprising:
   processing the gray-level information to identify a kernel of pixels in the image having respective gray-level values darker than a given kernel threshold;
   storing a locus of the pixels in the kernel in a memory; and
   storing in the memory the gray-level values of the pixels in the kernel, in order to reconstruct a gray-level image of the object by applying the stored gray-level values to the pixels in the locus.

2. A method according to claim 1, wherein the object comprises a document, and wherein processing the gray-level information comprises identifying a kernel corresponding to information in the document.

3. A method according to claim 2, wherein the document comprises a form having a template printed thereon, and wherein processing the gray-level information comprises separating an image of the template from characters filled into the template using gray-level values of pixels corresponding to the template and to the characters.

4. A method according to claim 3, wherein separating the image of the template from the characters comprises removing the image of the template from an image of the characters and filling gaps left in the characters due to removal of the template image using the gray-level information.

5. A method according to claim 3, and comprising reconstructing the image by combining stored gray-level values corresponding to the image of the template with the stored locus and gray-level values of the pixels in the kernel.

6. A method according to claim 5, wherein combining the stored gray-level values corresponding to the image of the template with the gray-level values of the pixels in the kernel comprises computing a combined gray-level value for a pixel at which the locus of the kernel overlaps with the image of the template.

7. A method according to claim 6, wherein computing the combined gray-level value comprises computing a normalized product of gray-level values from the kernel and from the template.

8. A method according to claim 1, and comprising defining a halo in the image surrounding the kernel and storing in the memory the gray-level values of the pixels in the halo, for use in reconstructing the image.

9. A method according to claim 8, wherein storing the gray-level values of the pixels in the halo comprises grouping the pixels by the respective gray-level values so as to reduce a volume of data to be stored.

10. A method according to claim 9, wherein grouping the pixels comprises masking one or more bits of the gray-levels values of the pixels.

11. A method according to claim 10, wherein masking the one or more bits comprises eliminating from the halo pixels having gray-level values beyond a given halo threshold.

12. A method according to claim 11, and comprising storing a locus of the bits remaining in the halo after the pixels having gray-level values beyond the given halo threshold are eliminated therefrom.

13. A method according to claim 9, wherein grouping the pixels comprises selecting a number of groups into which the pixels are to be divided and storing for each of the groups a respective representative gray-level value to for all of the pixels in the group.

14. A method according to claim 8, wherein the image to be compressed has a background including predetermined gray-level values of pixels therein, which are not stored along with the gray-level values of the pixels in the kernel and the halo, and comprising reconstructing the image by combining the stored gray-level values of the pixels in the kernel and the halo with the gray-level values of the pixels in the background.

15. A method according to claim 8, wherein storing the gray-level values of the pixels in the kernel and in the halo comprises storing the values as one or more continuous blocks of data and compressing the data in the blocks.

16. A method for compressing an electronic image of an object including gray-level information, comprising:
   processing the gray-level information to identify a kernel of pixels in the image having respective gray-level values darker than a given kernel threshold;
   storing a locus of the pixels in the kernel in a memory;
   storing in the memory the gray-level values of the pixels in the kernel, in order to reconstruct a gray-level image of the object by applying the stored gray-level values to the pixels in the locus;
   defining a halo in the image surrounding the kernel, wherein defining the halo comprises morphologically expanding the locus of the kernel; and
   storing in the memory the gray-level values of the pixels in the halo, for use in reconstructing the image.

17. A method according to claim 16, and comprising reconstructing the image by morphologically expanding the locus of the kernel and applying the stored gray-level values of the pixels in the halo to the expanded locus, wherein a locus of the pixels in the halo is not stored along with the stored locus of the kernel.

18. A method for compressing an electronic image of an object including gray-level information, comprising:
   processing the gray-level information to identify a kernel of pixels in the image having respective gray-level values darker than a given kernel threshold;
   storing a locus of the pixels in the kernel in a memory;
   storing in the memory the gray-level values of the pixels in the kernel, in order to reconstruct a gray-level image of the object by applying the stored gray-level values to the pixels in the locus;

defining a halo in the image surrounding the kernel;

storing in the memory the gray-level values of the pixels in the halo, for use in reconstructing the image, wherein the image to be compressed has a background including predetermined gray-level values of pixels therein, which are not stored along with the gray-level values of the pixels in the kernel and the halo; and reconstructing the image by combining the stored gray-level values of the pixels in the kernel and the halo with the gray-level values of the pixels in the background, wherein combining the stored gray-level values of the pixels in the halo with the gray-level values of the pixels in the background comprises selecting for the reconstruction at each pixel of the halo the darker of the respective stored gray levels of the pixel.

19. A method for compressing an electronic image of an object including gray-level information, comprising:

processing the gray-level information to identify a first group of pixels in the image having respective gray-level values darker than a first threshold;

processing the gray-level information to identify a second group of pixels in the image, in proximity to pixels in the first group, having respective gray-level values lighter than the first threshold; and storing the gray-level values of the pixels in the first and second groups in a memory, in order to reconstruct a gray-level image of the object by applying the stored gray-level values to the respective pixels in the first and second groups.

20. A method according to claim 19, wherein processing the gray-level information to identify the first group of pixels comprises finding a locus of the pixels in the first group, and wherein processing the gray-level information to identify the second group of pixels comprises selecting pixels in a halo surrounding the locus of the first group.

21. A method according to claim 19, wherein processing the gray-level information to identify the second group of pixels in the image comprises selecting only pixels having gray-level values darker than a second threshold for inclusion in the second group.

22. A method according to claim 19, wherein the object comprises a document, and wherein processing the gray-level information comprises identifying pixels corresponding to information content of the document.

23. A method according to claim 22, wherein the document comprises a preprinted template, and wherein processing the gray-level information to identify the first group comprises eliminating the template from the image to be processed.

24. A method for compressing an electronic image of an object including gray-level information, comprising:

processing the gray-level information to identify a first group of pixels in the image having respective gray-level values darker than a first threshold;

processing the gray-level information to identify a second group of pixels in the image, in proximity to pixels in the first group, having respective gray-level values lighter than the first threshold; and storing the gray-level values of the pixels in the first and second groups in a memory, in order to reconstruct a gray-level image of the object by applying the stored gray-level values to the respective pixels in the first and second groups, wherein processing the gray-level information to identify the first group of pixels comprises finding a locus of the pixels in the first group, and wherein processing the gray-level information to identify the second group of pixels comprises selecting pixels in a halo surrounding the locus of the first group, and wherein selecting the pixels in the halo comprises morphologically expanding the locus.

25. A method for reconstructing an electronic image of a document having a template preprinted thereon, the image including information filled into the template, comprising:

receiving stored gray-level data corresponding to an image of the template;

receiving stored gray-level data corresponding to the information filled into the template; and combining the data corresponding to the images of the template and of the information in mutual registration to produce an output gray-level image of the document, wherein the stored gray-level data corresponding to the image of the information comprises a kernel, identifying a locus of pixels containing the information, and wherein combining the data comprises applying respective stored gray-level values to the pixels in the kernel.

26. A method according to claim 25, wherein combining the data comprises finding a pixel at which the kernel intersects with a feature of the template and computing an output gray-level value of the pixel by combining respective stored gray-level values of the pixel in the image of the template and of the information.

27. A method according to claim 25, wherein the stored gray-level data corresponding to the information comprises a halo of pixels surrounding the kernel and having gray-level values lighter than the values of the pixels in the kernel.

28. A method according to claim 27, wherein the stored gray-level data corresponding to the image of the template comprises a background, and wherein combining the images comprises computing an output gray-level value of a pixel in the halo by combining respective stored gray-levels of the pixel in the background and in the information.

29. Apparatus for compressing an electronic image of an object including gray-level information, comprising:

a processor, which processes the gray-level information to identify a kernel of pixels in the image having respective gray-level values darker than a given kernel threshold; and a memory, in which the processor stores a locus of the pixels in the kernel along with the gray-level values of the pixels, whereby a gray-level image of the object is reconstructed by applying the stored gray-level values to the pixels in the locus.

30. Apparatus according to claim 29, wherein the object comprises a document, and wherein the kernel corresponds to information in the document.

31. Apparatus according to claim 30, wherein the document comprises a form having a template printed thereon, and wherein the processor separates an image of the template from the information filled into the template using gray-level values of pixels corresponding to the template and pixels corresponding to the information.

32. Apparatus according to claim 31, and comprising an image output device, wherein the processor reconstructs the image by combining stored gray-level values corresponding to the image of the template with the stored locus and gray-level values of the pixels in the kernel and outputs the reconstructed image to the output device.

33. Apparatus according to claim 29, wherein the processor defines a halo in the image surrounding the kernel and stores the gray-level values of the pixels in the halo in the memory, for use in reconstructing the image.

34. Apparatus according to claim 33, wherein the processor does not store a locus of the pixels in the halo in the memory.

35. Apparatus according to claim 33, wherein the processor groups the pixels in the halo by the respective gray-level values of the pixels so as to reduce a volume of data to be stored.

36. Apparatus according to claim 29, wherein the gray-level values of the pixels in the kernel and in the halo are stored in the memory as one or more continuous blocks of data, and wherein the processor compresses the data in the blocks.

37. Apparatus for compressing an electronic image of an object including gray-level information, comprising:

a processor, which processes the gray-level information to identify a first group of pixels in the image having respective gray-level values darker than a first threshold and a second group of pixels in the image, in proximity to pixels in the first group, having respective gray-level values lighter than the first threshold; and a memory, in which the processor stores the gray-level values of the pixels in the first and second groups, whereby a gray-level image of the object is reconstructed by applying the gray-level values to the respective pixels in the first and second groups.

38. Apparatus according to claim 37, wherein the processor finds a locus of the first group of pixels and identifies the second group by selecting pixels in a halo surrounding the locus of the first group.

39. Apparatus according to claim 37, wherein the processor selects only pixels having gray-level values darker than a second threshold for inclusion in the second group.

40. Apparatus according to claim 37, wherein the object comprises a document, and wherein the first group of pixels corresponds to characters in the document.

41. Apparatus according to claim 40, wherein the document comprises a preprinted template, and wherein the processor eliminates the template from the image prior to identifying the first and second groups.

42. Apparatus for reconstructing an electronic image of a document having a template preprinted thereon, the image including information filled into the template, comprising:

a processor, which receives stored gray-level data corresponding to an image of the template and to the information filled into the template, and which combines the data corresponding to the image of the template and the information in mutual registration to produce an output gray-level image of the document; and an image output device, which receives and displays the output gray-level image, wherein the stored gray-level data corresponding to the image of the information comprises a kernel, identifying a locus of pixels containing the information, and wherein the processor applies respective stored gray-level values to the pixels in the kernel.

43. A computer software product comprising computer-readable instructions in an executable file, which when run by a computer that receives an electronic gray-level image of an object, causes the computer to process the image so as to identify a kernel of pixels in the image having respective gray-level values darker than a given kernel threshold, and to store in a memory a locus of the pixels in the kernel along with gray-level values of the pixels in the kernel, to be used in reconstructing the gray-level image of the object by applying the stored gray-level values to the pixels in the locus.

44. A product according to claim 43, wherein the object comprises a form document having a template printed thereon, and wherein the instructions cause the computer to separate an image of the template from characters filled into the template using gray-level values of pixels corresponding to the template and to the characters.

45. A computer software product comprising computer-readable instructions in an executable file, which when run by a computer that receives an electronic gray-level image of an object, causes the computer to process the gray-level information to identify a first group of pixels in the image having respective gray-level values darker than a first threshold and a second group of pixels in the image, in proximity to pixels in the first group, having respective gray-level values lighter than the first threshold, and to store the gray-level values of the pixels in the first and second groups in the memory, to be used in reconstructing a gray-level image of the object by applying the gray-level values to the respective pixels in the first and second groups.

46. A product according to claim 45, wherein the object comprises a form document having a template printed thereon, and wherein the instructions cause the computer to eliminate the template from the image to be processed.

47. A computer software product comprising computer-readable instructions in an executable file, which is run by a computer, causing the computer to recall from a memory stored gray-level data corresponding to an image of a template preprinted on a form document and further to recall stored gray-level image data corresponding to information that was filled into the template, and to combine the data corresponding to the image of the template and to the information in mutual registration to produce an output gray-level image of the document, wherein the stored gray-level data corresponding to the image of the information comprises a kernel, identifying a locus of pixels containing the information, and wherein the processor applies respective stored gray-level values to the pixels in the kernel.

* * * * *